(12) United States Patent
Morita et al.

(10) Patent No.: US 6,174,828 B1
(45) Date of Patent: Jan. 16, 2001

(54) GRADIENT-INDEX OPTICAL ELEMENT AND ITS FABRICATION METHOD

(75) Inventors: Yuko Morita, Akiruno; Satoshi Noda, Akishima; Hiroaki Kinoshita, Hino, all of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/124,007

(22) Filed: Jul. 29, 1998

(30) Foreign Application Priority Data

Jul. 30, 1997 (JP) .................................................. 9-204851
Jun. 16, 1998 (JP) .................................................. 10-168414

(51) Int. Cl.$^7$ .................................................. C03C 3/078
(52) U.S. Cl. .................................................. 501/12; 501/72
(58) Field of Search .................... 501/12, 72; 65/17.2, 65/30.1, 30.13

(56) References Cited

U.S. PATENT DOCUMENTS

| | | | |
|---|---|---|---|
| 3,847,583 | * 11/1974 | Dislich et al. ........................ | 501/12 |
| 5,069,700 | * 12/1991 | Yamane et al. ....................... | 501/12 |
| 5,166,827 | 11/1992 | Noda . | |
| 5,171,344 | * 12/1992 | Noda .................................... | 65/30.1 |
| 5,244,844 | * 9/1993 | Inami et al. .......................... | 501/12 |
| 5,349,473 | 9/1994 | Kurasawa et al. . | |
| 5,366,939 | 11/1994 | Kurasawa et al. . | |
| 5,448,409 | 9/1995 | Noda . | |
| 5,837,023 | * 11/1998 | Koike et al. ........................ | 65/30.13 |
| 5,858,892 | * 1/1999 | Kinoshita .............................. | 501/12 |

* cited by examiner

Primary Examiner—Karl Group
(74) Attorney, Agent, or Firm—Pillsbury Madison & Sutro LLP

(57) ABSTRACT

A gradient-index optical element comprises $SiO_2$, BaO, and $TiO_2$ as essential components, and has a refractive index profile in its diametrical direction. The molar ratio of barium to silicon at the center of the element in its diametrical direction is limited to $Ba/Si \geq 0.4$. This gradient-index optical element has a small refractive index difference with reduced chromatic aberrations and, hence, is suitable for use with optical equipment.

14 Claims, No Drawings

GRADIENT-INDEX OPTICAL ELEMENT AND ITS FABRICATION METHOD

BACKGROUND OF THE INVENTION

1. Field of the Invention

The present invention relates to a gradient-index optical element used as optical lenses for cameras, microscopes, endoscopes, etc., and a method of making the same.

2. Discussion of Related Art

A gradient-index optical element (hereinafter often called a GRIN lens) is a new optical element having a lens action based on a refractive index gradient or profile across a lens medium. This optical element has an unheard-of ability to make correction for aberrations. In particular, a radial type of gradient-index optical element (r-GRIN for short) having a refractive index profile in its radial direction can make correction for aberrations uncorrectable even by use of aspheric lenses, for instance, curvature of field and chromatic aberrations, and so now attracts attention as one next-generation optical element.

The GRIN lens has the feature of being able to make correction for chromatic aberrations and, hence, can be effectively applied to lens systems handled with white light sources, for instance, cameras, and microscopes. The property of the GRIN lens, by which chromatic aberrations can be corrected, is called a low or negative dispersion profile property. Roughly speaking, the refractive index of the element in its diametrical direction changes from the state of high refractive index and low dispersion to the state of low refractive index and high dispersion. Some element constructions of the GRIN lens having such property are disclosed in U.S. Pat. Nos. 5,166,827, 5,366,939 and 5,349,493. The dispersion profile property of a medium is represented by its Abbe number, say, $V_{10}$ ($=N_{d10}/(N_{F10}-F_{c10})$). The Abbe number of a medium implies that the smaller the positive value thereof, the larger the chromatic aberrations produced in the medium is. Such property is called a high dispersion profile property.

When $V_{10}$ has a large positive value, there is achieved a so-called low dispersion profile where the chromatic aberrations produced in the medium are reduced. When $V_{10}$ is infinitely great, there is obtained a zero dispersion profile where no chromatic aberrations are produced at all.

When $V_{10}$ has a negative value, there is obtained a so-called low dispersion profile. With the negative dispersion profile, too, the larger the negative value, the smaller the chromatic aberrations produced are, and the smaller the negative value, the larger the chromatic aberrations produced are. Unlike the case of a high dispersion profile-low dispersion profile where the direction of chromatic aberrations produced has a positive value, however, red or other light of longer wavelength increases in the amount of refraction while blue or other light of shorter wavelength decreases in the amount of refraction. Such chromatic aberrations are a unique phenomenon that is not found in the case of glass lenses. Thus, a lens material having such chromatic aberrations is believed to open up a new possibility for optical system designs.

Particularly effective in this regard is a gradient-index optical element having a low dispersion profile where chromatic aberrations are less produced, and a negative dispersion profile where chromatic aberrations are produced in a direction opposite to an ordinary direction.

The GRIN lens has two important properties; one is that no chromatic aberrations are produced in the medium, and another is that a refractive index difference Δn between the optical axis and the periphery of the lens—which determines the amount of bending of light through the medium—is large. The larger the Δn value, the larger the bending of light rays through the GRIN lens is, and so the lens action per unit length of the GRIN lens becomes great. It is thus possible to make the length of the lens short. This in turn can not only achieve size reductions of lens systems, but also achieve high performance by making use of large refracting power, for instance, a wide field angle available to lens systems.

Δn is determined by a concentration difference of dopant between the center and the periphery of a GRIN lens, which dopant imparts a gradient-index across the GRIN lens. To obtain a GRIN lens having a large Δn, it is thus required to give a large concentration difference of the dopant across the lens.

For glass compositions that can provide inexpensive glasses having such properties on industrially large scales and in stable manners, U.S. Pat. No. 5,448,409 discloses an $SiO_2$—$BaO$—$TiO_2$—$K_2O$ composition system. Although the glass composition disclosed therein provides stable glasses and is suitable for mass production, yet it is difficult to obtain Δn values of about 0.02 or larger. In this $SiO_2$—$BaO$—$TiO_2$—$K_2O$ composition system, the refractive index profile-determining dopant is a barium component, and it is difficult to impart a large concentration difference across the barium component. Thus, there is a certain limit on the magnitude of Δn achievable within the composition range disclosed therein.

The reason no large value can be obtained for Δn is that no sufficient barium concentration difference is obtained between the center and the periphery of the element. Upon a careful examination, it is noted that the reason no sufficient barium concentration difference is obtained between the center and the periphery of the element is that it is difficult to lower the barium concentration at the periphery of the element.

The impartment of a concentration profile to barium, for instance, is achieved by dipping gel in alcohol or other solvent for a certain time, thereby allowing barium present in the gel to be diffused and eluted in the dipping solution. This is presumed to render it difficult to lower the concentration of barium at the periphery of the element.

The diffusion and elution of barium take place due to a difference between the concentration of barium in the gel and the concentration of barium in the treating solution in which the gel is dipped. Since the amount of the treating solution in which the gel is dipped is limited, however, the concentration of barium in the treating solution increases with the barium component eluted out of the gel until there is no concentration difference between inside and outside the gel, putting a stop to the diffusion of barium. It is thus impossible to make the concentration of barium at the periphery of the gel lower than the concentration of barium in the dipping solution.

On the other hand, it may be possible to continuously remove the barium component eluted in the dipping solution. However, such continuous removal of the barium component from the dipping solution offers an unstable factor to the dipping treatment, and so is not practical for strictly controlling the concentration of barium in the gel with high reproducibility.

A chief object of the present invention is to provide, with stable quality and ease, a gradient-index optical element material having a low dispersion profile and a negative dispersion profile and so effective for application to optical equipment, and having a large $\Delta n$ value. A particular object of the present invention is to provide a gradient-index optical element material which has a concentration profile across a barium component, and is of excellent quality.

SUMMARY OF THE INVENTION

According to one aspect of the present invention, there is provided a gradient-index optical element composed essentially of $SiO_2$, BaO, and $TiO_2$, and having a refractive index profile in its diametrical direction, wherein the molar ratio of barium to silicon at a diametrical center thereof is $Ba/Si \geq 0.4$.

Preferably, the molar ratio of titanium to silicon in the diametrical direction of the element is kept constant in the range given by $Ti/Si \geq 0.2$.

Preferably, the gradient-index optical element has no concentration profile in the range wherein the molar ratio of titanium to silicon in the diametrical direction thereof is $Ti/Si \geq 0.2$.

Preferably, the gradient-index optical element conforms to:

$(\Delta Ti / \Delta Ba) \leq 0.15$

Here $\Delta Ba$ is a difference in barium element ratio between the periphery and the center of the element, and $\Delta Ti$ is a difference in titanium element ratio between the periphery and the center of the element.

According to another aspect of the present invention, there is provided a method of making a gradient-index optical element by a sol-gel technique, wherein a barium component is eluted out of a periphery of a wet gel in which the molar ratio of barium to silicon is $Ba/Si \geq 0.4$.

According to yet another aspect of the present invention, there is provided a method of making a gradient-index optical element by a sol-gel technique, comprising steps of:

stirring, and mixing raw materials at a molar ratio of barium to silicon that is $Ba/Si \geq 0.4$ for gelation, imparting a concentration profile to the thus obtained wet gel, and vitrifying the wet gel.

According to a further aspect of the present invention, there is provided a method of making a gradient-index optical element by a sol-gel technique, comprising steps of:

impregnating a barium component into a wet gel in which the molar ratio of barium to silicon is $Ba/Si < 0.4$ until a molar ratio of $Ba/Si \geq 0.4$ is reached, and eluting the barium component out of the periphery of the wet gel.

DESCRIPTION OF THE PREFERRED EMBODIMENT

The present invention provides a gradient-index optical element wherein the concentration of barium at its diametrical center is so high that the difference in the concentration of barium between the center and the periphery thereof—which is a great problem with the prior art—can be increased.

To this end, the molar concentration of barium to silicon at the diametrical center axis of the element is limited to $Ba/Si \geq 0.4$ to increase the concentration of barium at the center of the element. This enables the concentration difference to be increased even when the concentration of barium at the periphery of the element is not sufficiently low, so that the value of $\Delta n$ can be increased. The increase in the concentration of barium at the center of the element makes it possible not only to increase the barium concentration difference between the center and the periphery of the element but also to increase the refractive index of the element at its optical axis, leading to an additional advantage of increasing the refraction of light at the lens surface. If the barium concentration (Ba/Si) is lower than 0.4, the threshold value of $\Delta n$ is then approximately 0.02. By making the barium concentration (Ba/Si) at the center of the element greater than 0.4, however, it is possible to obtain a much larger $\Delta n$ value. Combined with an increase in the refractive index of the element at its optical axis, this makes a great contribution to the size reduction, and upgrading of optical systems.

In the negative dispersion profile where the dispersion profile extends from the vicinity of zero to a negative region, it is difficult to achieve a particularly large $\Delta n$ value. If the Ba/Si value is increased, however, it is then possible to obtain a practically acceptable $\Delta n$ value. Especially in the negative dispersion profile region where the value of $V_{10}$ is found in a negative region, it has been difficult to obtain a $\Delta n$ value of 0.01 or greater. According to the present invention, however, a $\Delta n$ value as great as about 0.02 can be obtained.

A conventional gradient-index optical element may have chromatic aberrations reduced by control of glass composition. However, if the surface of this element is curved by polishing to have a refracting action at the lens surface in addition to the refraction of light rays by the refractive index profile across the lens medium, additional chromatic aberrations are then produced by the refraction of light rays at the lens surface. According to the gradient-index optical element of the invention, such chromatic aberrations can be reduced by keeping the diametrical concentration of titanium in silicon at a consistent value in the range defined by $Ti/Si \geq 0.2$.

U.S. Pat. No. 5,448,409 discloses that silicon is diametrically doped with titanium at a constant concentration for the purpose of making correction for chromatic aberrations. However, it is now found that when titanium is eluted out of the periphery of gel during its treating process to impart a slightly convex profile to the titanium component, considerable chromatic aberrations are produced as in the case where the concentration of titanium is low as usual. Especially when such a slight convex profile is given to titanium, titanium should be used in a larger amount than required for a flat profile.

In a composition region where $Ti/Si \geq 0.2$, a gradient-index optical element having a low or negative dispersion profile may be obtained even when some amount of titanium has a convex profile. The higher the concentration of titanium at the center, the larger the convex concentration profile of titanium is. Nonetheless, it is possible to obtain such dispersion profile properties.

To what degree titanium has a convex profile may be effectively determined by the ratio of its size to the size of the convex profile of barium. The size of the convex profile of titanium is represented by a difference $\Delta Ti$ in the Ti/Si ratio between the center and the periphery of the element, while the size of the convex profile of barium is represented by a difference $\Delta Ba$ in the Ba/Si ratio between the center and the periphery of the element.

Referring here to a gradient-index optical element where the composition at its center is $Ti/Si \geq 0.2$, optical properties exhibiting a low dispersion profile are obtained at $\Delta Ti / \Delta Ba \leq 0.15$. More preferably, $\Delta Ti / \Delta Ba \leq 0.10$.

If the composition at the center of the element is $Ti/Si \geq 0.3$, optical properties exhibiting a low and negative dispersion profile are then obtained at $\Delta Ti / \Delta Ba \leq 0.20$.

The convex concentration profile of titanium is effective not only for the dispersion profile properties but also for increasing the refractive index difference. This in turn results in an additional advantage of increasing the refractive index difference due to the convex dispersion of barium.

At the dipping step in the fabrication process of gradient-index optical elements, it is difficult to achieve perfect prevention of elution of titanium. Even if this is somehow achieved, then options available for dipping conditions become narrow. From the perspective of the fabrication process, it is favorable to allow titanium to have a convex concentration profile within a suitable range, because options available for the dipping conditions become broad.

In a gradient-index optical element, the barium component that is a determinant of the bending of light, and the titanium component that is a determinant of chromatic aberrations have basically separate concentration profiles, and independently acting compositions. Accordingly, a sensible tradeoff can be made between properties by applying the optimum conditions to the respective compositions. An gradient-index optical element, if it meets two such properties in a well-balanced state, has then a unique effect; it is well capable of forming images in a single lens form.

In general, as the amount of titanium increases, the dispersion profile changes from the low dispersion profile to the negative dispersion profile, but the $\Delta n$ value tends to become small. To obtain a large $\Delta n$ value, it is thus required to increase the amount of barium with an increasing amount of titanium. However, as both components become too much, the amount of silicon to form a glass skeleton decreases relatively, making vitrification difficult. If vitrification is somehow achieved, no practically acceptable glass can then be obtained because thermal and chemical durability becomes worse. From the perspective of glass stability, $(Ba+Ti)/Si<$ about 1.2 is a practically acceptable range. However, a more stable region is given by $(Ba+Ti)/Si<1.1$. As the amount of Si increases, glass becomes more stable, but the optical ability of the glass tends to drop. It is here to be noted that it is difficult to place no definite lower limit on the content of Si because the optical ability of glass varies with the specifications required for optical systems for which the glass is used.

The glass containing the components according to the present invention may be produced by allowing the barium component to be eluted out of a specific gel in which the concentration of barium has previously been limited to $Ba/Si \geq 0.4$. To impart a barium concentration profile across the gel to thereby obtain a refractive index profile of optically high value, it is desired to dip the gel in a dipping solution so that the barium component can be eluted therein under diffusion action, or exchange barium ions in the gel with cations in the gel dipping solution so that the barium component can be eluted therein. To this end, it is preferable to prepare a specific gel having a barium concentration previously limited to $Ba/Si \geq 0.4$. Then, the gel is dipped in the treating solution.

To have a wide range of optical applications, a gradient-index optical element should have preferably a substantially parabolic form of refractive index profile. Consequently, the concentration of barium, too, has preferably such a profile. When the barium component is eluted by dipping in the treating solution to obtain a parabolic concentration profile, the concentration of barium at the center of the gel, too, is somewhat lower than the initial concentration of barium. In most cases, the concentration of barium at the center of the gel drops to about 80% of the initial concentration of barium although varying depending on the shape of the gel, the required refractive index profile, etc. It is thus preferable that the concentration of barium contained in the gel before subjected to the dipping treatment is $Ba/Si \geq 0.6$.

A specific gel containing barium at such a high concentration may be prepared by stirring and mixing raw materials at $Ba/Si \geq 0.4$, and preferably $Ba/Si \geq 0.6$ to prepare a sol, and gelating the sol. At the sol stage, the respective constituting elements remain mixed together in a solution state. Consequently, consistency at the molecular or atomic level is achievable by sufficient stirring. It is preferable that barium is contained in the gel before the application of the concentration profile at a high concentration and in a homogeneous state, because the barium concentration is unlikely to have a profile prior to the dipping treatment. Even when the concentration profile is imparted by diffusion to barium, it is preferable that the gel has a substantially homogenous structure because good reproducibility is ensured.

However, it is substantially impossible to introduce a large amount of the barium component in the sol using an alkoxide as the starting material, because the alkoxide has a low solubility. Even when the starting material is in a metal salt form, a large amount of solvent is required to achieve a concentration of $Ba/Si \geq 0.4$. In this case, the strength of the gel becomes low upon the gelation of the sol, offering a problem in connection with gel handling, etc.

For instance, the specific gel containing barium at a high concentration is prepared by mixing a barium material in the form of a barium salt having a high solubility in a solvent, e.g., barium chloride, barium nitrate or barium acetate with a mixed solution of silicon alkoxide and titanium alkoxide. In this case, the silicon alkoxide and titanium alkoxide may be partially hydrolyzed for their stable reaction by mixing. It is preferable to use a solvent in which a large amount of barium salt can be dissolved, e.g., water, lower alcohols such as methanol, cellosolves, and various diols. For gelation, it is not preferable to use a large amount of salt having a high basicity, because gelation proceeds to a higher degree than required or the gelation rate becomes too high to achieve uniform and sufficient stirring of the mixture. This results in the unavoidable formation of a non-uniform gel, a gel with separated phases or a gel with striae, which cannot longer have any optical applications.

The strength of the gel may be enhanced by reducing the amount of the solvent used for sol formation. However, the reduction in the amount of the solvent results in a reduction in the amount of the barium salt to be dissolved in the solvent. To make sure of the solubility of barium, it is thus preferable to previously heat the solvent or sol with the barium salt dissolved therein to a temperature that has no adverse influence on the gelation reaction.

Alternatively, it is also preferable to introduce the barium component from outside in a barium component-free gel or a gel with a low barium concentration. It is effective to impregnate the gel with the barium component until the concentration of barium in the gel is $Ba/Si \geq 0.4$, and preferably $Ba/Si \geq 0.6$.

For the introduction of the barium component, a barium salt solution having a concentration of about 0.1 mol/l to about 2 mol/l is used as the treating solution in which the gel is to be dipped. It is then preferred that the gel is dipped in the treating solution for a time long-enough for ensuring that the barium component has a consistent concentration in the gel, because it is desired to uniformly introduce the barium component in the gel with no concentration profile imparted thereto.

When the gel is prepared from the sol containing the barium component at a high concentration, there is often found a phenomenon in which a local gelation reaction proceeds during gelation, with the result that any gel having consistent components cannot be formed. This phenomenon becomes noticeable as the concentration of barium in the sol increases. Such a local gelation may be averted by retarding the gelation reaction by varying conditions such as solvent, and pH. Although these conditions may be varied to vary the gelation rate, they have great influences not only on the structure of the obtained gel but also on the strength of the gel, the state of diffusion of the components contributing to the index of refraction during the formation of the concentration profile, and yields at the drying, and sintering steps. Thus, there is a certain limit on the retardation of the gelation rate. The method of the present invention is effective even for such a case.

After gelation according to the instant method, the gel is impregnated with barium as mentioned above. The barium is neither chemically took in the gel skeleton structure nor physically confined in skeleton structure-forming pores, and so is easily eluted in the dipping solution. This implies that the concentration of barium at the periphery of the element is much more reduced, making it possible to obtain a much larger $\Delta n$ value.

In either case, it should be avoided that the concentration of barium at the center of the element becomes lower than required when the concentration profile is imparted to the barium component and, hence, it is desired that the amount of barium eluted out of the gel be reduced as much as possible. For instance, it is effective to reduce as much as possible the diameter of pores in the gel located at the center of the element, thereby controlling the elution of barium at the center of the element. In this case, it is required to determine the condition for the achievement of the parabolic concentration profile depending on some parameters, because barium does not behave according to a simple diffusion law; its behavior is unexpected.

To allow the element to have no concentration profile in the range where the molar ratio of titanium to silicon in the diametrical direction thereof is given by $Ti/Si \geq 0.2$, it is required that when the concentration profile is imparted to the barium component, the titanium component be not eluted under the same action as in the barium component. For instance, titanium may be allowed to have a binding relation to the gel skeleton, thereby preventing ready elution of titanium. It is here to be noted that barium is allowed to exist in the gel skeleton without having any binding relation thereto. For example, only titanium is allowed to react selectively with a silicon skeleton during sol preparation. To this end, alkoxides of silicon and titanium or their derivatives are used as the starting materials, so that direct chemical bonds are produced during the sol-forming reaction. For the barium component, on the other hand, a metal salt of barium is used as the starting material so that it has no binding relation to silicon. Alternatively, the previously prepared gel may be dipped in the barium component-containing solution to impregnate the gel with the barium component.

When titanium is allowed to have a convex profile, too, it is desired that the titanium component be not eluted under same action as in the barium component, because such convex shape is smaller than that of the barium component. To this end, it is essentially required that barium exist in the gel skeleton, and that titanium be allowed to have a binding relation to the gel skeleton while the strength of binding between titanium and the gel skeleton is regulated in such a manner that slight elution of titanium can take place. Alternatively, the convex profile may also be given to the titanium component by using a dipping solution having a slight action on the shearing of the skeleton bond at the gel-dipping step. Specific parameters for regulating the strength of binding between titanium and the gel skeleton, for instance, are the type and amount of the solvent used for sol preparation, the temperature and time of aging carried out after the gelation of the sol, etc.

For the solution at the dipping step, use may be made of a solution containing a dilute acid such as dilute hydrochloric or sulfuric acid.

The composition ratio of titanium and barium making a great contribution to the refractive index profile or dispersion profile properties has been explained in detail. In the practice of the invention, the element may additionally contain alkaline metals such as $K_2O$, and $Na_2O$ for the purpose of obtaining effects on promoting vitrification, lowering firing temperature, and relaxing thermal expansion. These metals may be introduced in the element by mixing them with the sol during sol preparation, or dipping the gel in a solution in which inorganic or organic slats thereof are dissolved. The diffusion of Ba in the gel is promoted by dipping the Ba salt-containing gel in a dipping solution containing these ions.

The dispersion profile-controlling component, $TiO_2$, may be replaced by $Ta_2O_5$ or $Nb_2O_5$ in a range undetrimental to the effect of the present invention.

Preferably in this case, $TiO_2$ is replaced by $Ta_2O_5$ in an amount corresponding to $Ta_2O_5/SiO_2=0.05$ to $0.08$ provided that $TiO_2/SiO_2=0.1$, or $Nb_2O_5$ in an amount corresponding to $Nb_2O_5/SiO_2=0.09$ to $0.1$.

However, the alkoxides of Ta and Nb are more difficult in reaction control than the alkoxide of Ti, and cost much as well; the larger the content of Ti, the more advantageous results are obtained from the reaction, and cost perspectives.

EXAMPLE

To explain the present invention more specifically, examples are given below.

Example 1

Fifteen (15) ml of 0.01 N hydrochloric acid were added to, and stirred with, 50 ml of tetramethyl silicate for 1 hour for a partial hydrolysis reaction. Under continued stirring, 60 ml of ethanol with 35 g of titanium n-butoxide dissolved therein were added dropwise to the resultant solution. Stirring was continued for a further 1 hour to obtain a sol by the reaction of titanium n-butoxide. At room temperature (25° C.), a solution mixture of 218 ml of an aqueous solution containing 1.5 mol/l of barium acetate and 85 ml of acetic acid was added to the sol while it was heated to 40° C.

The solution was stirred for a further 3 minutes, and then poured into a fluorocarbon resin vessel of 10 mm in diameter to a depth of 30 mm. The vessel was closed off by putting the lid thereon for gelation at room temperature. Subsequently, the resultant gel was aged for 5 days, after which the gel was removed out of the vessel. Forty-five (45) such gels were placed in a 2-liter separable flask provided with a reflux tube, in which flask a solution having 0.45 mol/l of barium acetate dissolved in a 60° C. mixed solution of isopropanol and water at 6:4 was poured. While the vessel was heated over a water bath at a liquid temperature of 60° C., the solution was stirred therein for 2 days using a magnetic stirrer for acetic acid removal, and gel aging.

After the completion of the aging-in-solution, the gels were dipped in varying solvents, say, methanol:ethanol at 5:5, and then ethanol, thereby precipitating and fixing microcrystalline barium acetate in gel pores. The obtained homogeneous gel was dipped for 23 hours in 150 ml of a solution regulated to provide a methanol solution containing 0.3 mol/l of potassium acetate and a methanol solution containing 0.15 mol/l of acetic acid to impart a concentration profile thereto, and then dipped in acetone to impart concentration profiles to microcrystalline barium acetate and potassium acetate, thereby precipitating and fixing them in the gel pores.

This gel was dried in 30° C. dry air for 5 days into a dry gel, which was finally heated to and sintered at 730° C. in a tubular furnace through which oxygen and helium were passed, thereby obtaining a crackless glass having a diameter of 4 mm.

Set out in Table 1 are the concentrations of the components of the obtained glass as well as the Δn, and $V_{10}$ thereof. The glass composition, expressed by mol % calculated as oxides, refers to a composition at the center of the glass corresponding to the optical axis of a gradient-index optical element.

Examples 2 to 15

Glasses were obtained as in Example 1 with varying amounts, blending ratios, and concentrations of components, varying dipping time periods, etc. The concentrations of the components of the glasses as well as the Δn, and $V_{10}$ thereof are set out in Table 1. The glass composition is represented by mol %, calculated as oxides, of the element ratio found by actual quantitative analysis of the composition distribution of the obtained gradient-index optical element, and refers to a composition at the center of the glass corresponding to the optical axis of a gradient-index optical element. The Ba/Si, and Ti/Si ratios, too, refer to a composition ratio at the center of the glass.

In Examples 2, 3 and 8, and Examples 4, 5, and 9, the larger the Ba/Si at the center, the greater the Δn value is, with the proviso that Ti/Si remains constant. In Examples 6, 7, 8, 9, and 10, as the Ti/Si ratio increases, the dispersion profile tends to change to a low or negative dispersion profile with a decrease in the Δn value, with the proviso that the Ba/Si ratio at the center is on the same level.

TABLE 1

| Ex. | $SiO_2$ (mol %) | BaO (mol %) | $TiO_2$ (mol %) | $K_2O$ (mol %) | Ba/Si | Ti/Si | Δn | $V_{10}$ |
|---|---|---|---|---|---|---|---|---|
| 1 | 46.1 | 34.9 | 14.5 | 4.6 | 0.771 | 0.300 | 0.026 | 680 |
| 2 | 57.4 | 24.6 | 12.3 | 5.7 | 0.429 | 0.214 | 0.0214 | 118.9 |
| 3 | 49.0 | 35.0 | 10.5 | 5.6 | 0.714 | 0.214 | 0.0291 | 107.6 |
| 4 | 52.6 | 22.6 | 18.8 | 6.0 | 0.429 | 0.357 | 0.0134 | −44.4 |
| 5 | 44.3 | 35.4 | 15.8 | 4.4 | 0.800 | 0.357 | 0.0194 | −54.7 |
| 6 | 50.0 | 28.6 | 15.7 | 5.7 | 0.571 | 0.314 | 0.0218 | −110.9 |
| 7 | 53.4 | 30.5 | 10.7 | 5.3 | 0.571 | 0.200 | 0.0272 | 93.2 |
| 8 | 53.0 | 30.3 | 11.4 | 5.3 | 0.571 | 0.214 | 0.0262 | 113.6 |
| 9 | 49.3 | 28.2 | 17.6 | 4.9 | 0.571 | 0.357 | 0.0162 | −47.1 |
| 10 | 49.0 | 28.0 | 19.6 | 3.5 | 0.571 | 0.400 | 0.0131 | −24.5 |
| 11 | 49.3 | 37.3 | 8.5 | 4.9 | 0.757 | 0.171 | 0.0328 | 69 |
| 12 | 45.8 | 31.4 | 17.0 | 5.9 | 0.686 | 0.371 | 0.0172 | −45 |
| 13 | 46.1 | 34.9 | 14.5 | 4.6 | 0.757 | 0.314 | 0.0221 | −125.9 |
| 14 | 53.0 | 35.6 | 6.1 | 5.3 | 0.671 | 0.114 | 0.0363 | 49.4 |
| 15 | 59.8 | 27.4 | 6.0 | 6.8 | 0.457 | 0.100 | 0.0312 | 46.8 |

Comparative Examples 1 to 3

Glasses with compositions departing from the scope of the invention were prepared as in Example 1. These glasses are found to have very limited optical applications as can be understood from the Δn, and $V_{10}$ thereof as measured, and especially the fact that the refractive indices, Δn, are all small.

Here again, the glass composition given in Table 2 is represented by mol %, calculated as oxides, of the element ratio found by actual quantitative analysis of the composition distribution of each of the obtained gradient-index optical elements, and refers to a composition at the center of the glass corresponding to the optical axis of the gradient-index optical element. The Ba/Si, and Ti/Si ratios, too, refer to a composition ratio at the center of the glass.

TABLE 2

| | | $SiO_2$ (mol %) | BaO (mol %) | $TiO_2$ (mol %) | $K_2O$ (mol %) | Ba/Si | Ti/Si | Δn | $V_{10}$ |
|---|---|---|---|---|---|---|---|---|---|
| Comp. Ex. | 1 | 64.6 | 18.3 | 13.9 | 3.2 | 0.283 | 0.215 | 0.0116 | 144.5 |
| | 2 | 59.4 | 13.1 | 20.7 | 6.8 | 0.221 | 0.348 | 0.0068 | −43.3 |
| | 3 | 53.3 | 17.4 | 23.9 | 5.6 | 0.326 | 0.448 | 0.0093 | −22.1 |

Examples 16 to 19

Glasses were prepared as in Example 1 with the exception that the obtained gels are dipped in hydrochloric acid to elute the titanium component from the peripheries thereof to vary the concentration of the titanium component at the peripheries. The concentrations of the components of the glasses as well as the Δn and $V_{10}$ thereof are set out in Table 3 together with those of Example 12. The glass composition, expressed by mol % calculated as oxides, refers to a composition at the center of the glass corresponding to the optical axis of a gradient-index optical element.

The size of the convex profile is small as expressed by Ti/Si=0.028 even in Example 19 in which the Ti amount difference is greatest, and is a few % even as compared with Ti/Si at the center. Even with such a small difference, however, the Δn value, and the value of $V_{10}$ showing the dispersion profile vary largely. It is thus essentially required to apply the method of the present invention to control of the concentration profile of titanium.

Example 26

Twenty-five (25) ml of 0.01 N hydrochloric acid were added to, and stirred with, 50 ml of tetramethyl silicate for 1 hour for a partial hydrolysis reaction. Under continued stirring, ethanol with 35 g of titanium n-butoxide dissolved therein was added dropwise to the resultant solution. Stirring was continued for a further 1 hour for sufficient reaction. A solution mixture consisting of 218 ml of an aqueous solution containing 1.5 mol/l of barium acetate and 85 ml of acetic acid and heated to 40° C. was added to the sol. The solution

TABLE 3

| | | $SiO_2$ | BaO | $TiO_2$ | $K_2O$ | Ba/Si | | Ti/Si | | | | |
|---|---|---|---|---|---|---|---|---|---|---|---|---|
| | | mol % | mol % | mol % | mol % | center | periphery | center | periphery | ΔTi/ΔBa | Δn | $V_{10}$ |
| Example | 12 | 45.8 | 31.4 | 17.0 | 5.9 | 0.686 | 0.415 | 0.371 | 0.371 | 0 | 0.0172 | −45 |
| | 16 | 45.8 | 31.4 | 17.0 | 5.9 | 0.686 | 0.415 | 0.371 | 0.364 | 0.025 | 0.0195 | −97.7 |
| | 17 | 45.8 | 31.4 | 17.0 | 5.9 | 0.686 | 0.415 | 0.371 | 0.357 | 0.052 | 0.0219 | −1173.3 |
| | 18 | 45.8 | 31.4 | 17.0 | 5.9 | 0.686 | 0.415 | 0.371 | 0.350 | 0.077 | 0.0243 | 149.1 |
| | 19 | 45.8 | 31.4 | 17.0 | 5.9 | 0.686 | 0.415 | 0.371 | 0.343 | 0.10 | 0.0267 | 77.3 |

Examples 20 to 25

Glasses were obtained as in Example 16 with varying amounts, blending ratios, and concentrations of components, varying dipping time periods, etc. The concentrations of the components of the glasses as well as the Δn, and $V_{10}$ thereof are set out in Table 4. The glass composition is represented by mol %, calculated as oxides, of the element ratio found by actual quantitative analysis of the composition distribution of the obtained gradient-index optical element, and refers to a composition at the center of the glass corresponding to the optical axis of the gradient-index optical element.

Comparative Example 4

A glass was obtained as in Example 16 with varying amounts, blending ratios, and concentrations of components, a varying dipping time, etc. The concentrations of the components of the glass as well as the Δn, and $V_{10}$ thereof are set out in Table 4. The glass composition is represented by mol %, calculated as oxides, of the element ratio found by actual quantitative analysis of the composition distribution of the obtained gradient-index optical element, and refers to a composition at the center of the glass corresponding to the optical axis of the gradient-index optical element.

The gradient-index glass, because of having too large a ΔTi/ΔBa value, showed a high dispersion profile where chromatic aberrations were produced in larger amounts.

was stirred for a further 3 minutes, and then poured into a fluorocarbon resin vessel of 10 mm in diameter to a depth of 30 mm. The vessel was closed off by putting the lid thereon for gelation at room temperature. Subsequently, the resultant gel was aged for 5 days, after which the gel was removed out of the vessel. Forty-five (45) such gels were placed in a 2-liter separable flask provided with a reflux tube, in which flask a solution having 0.45 mol/l of barium acetate dissolved in a 60° C. mixed solution of isopropanol and water at 6:4 was poured, and the lid was again put on the vessel. While the vessel was heated at a liquid temperature of 60° C., the solution was stirred therein for 2 days for acetic acid removal, and gel aging.

After the completion of the aging-in-solution, the gels were dipped in varying solvents, say, methanol:ethanol at 5:5, and then ethanol, thereby precipitating and fixing microcrystalline barium acetate in gel pores.

The obtained homogeneous gel was dipped for 23 hours in 150 ml of a solution regulated to provide a methanol solution containing 0.3 mol/l of potassium acetate and a methanol solution containing 0.15 mol/l of acetic acid to impart a concentration profile thereto, and then dipped in acetone to impart concentration profiles to microcrystalline barium acetate and potassium acetate, thereby precipitating and fixing them in the gel pores.

This gel was dried in 30° C. dry air for 5 days into a dry gel, which was finally heated to and sintered at 730° C. in a

TABLE 4

| | | $SiO_2$ | BaO | $TiO_2$ | $K_2O$ | Ba/Si | | Ti/Si | | | | |
|---|---|---|---|---|---|---|---|---|---|---|---|---|
| | | mol % | mol % | mol % | mol % | center | periphery | center | periphery | ΔTi/ΔBa | Δn | $V_{10}$ |
| Example | 20 | 44.5 | 30.3 | 19.5 | 5.7 | 0.681 | 0.272 | 0.438 | 0.379 | 0.143 | 0.0422 | 78.2 |
| | 21 | 46.8 | 27.6 | 18.4 | 7.2 | 0.590 | 0.286 | 0.393 | 0.361 | 0.106 | 0.0310 | 107.6 |
| | 22 | 52.2 | 22.8 | 20.5 | 4.5 | 0.437 | 0.216 | 0.393 | 0.375 | 0.078 | 0.0216 | −304.7 |
| | 23 | 54.5 | 23.4 | 16.3 | 5.6 | 0.429 | 0.221 | 0.299 | 0.290 | 0.043 | 0.0257 | 220 |
| | 24 | 58.0 | 23.7 | 13.3 | 5.0 | 0.409 | 0.181 | 0.229 | 0.224 | 0.023 | 0.0320 | 95 |
| | 25 | 46.0 | 34.5 | 13.5 | 6.0 | 0.75 | 0.435 | 0.293 | 0.285 | 0.027 | 0.028 | 188 |
| Comp. Ex. | 4 | 58.0 | 23.7 | 13.3. | 5.0 | 0.409 | 0.181 | 0.229 | 0.174 | 0.242 | 0.0544 | 27.2 | tubular furnace through which oxygen and helium were passed, thereby obtaining a crackless glass having a diameter of 4 mm. This glass had a composition similar to that of Example 12, say, Ba/Si=0.771 and Ti/Si=0.3, and had such optical properties as reprsented by $\Delta n=0.026$ and $V_{10}=680$.

Example 27

Twenty-five (25) ml of 0.01 N hydrochloric acid were added to, and stirred with, 50 ml of tetramethyl silicate for 1 hour for a partial hydrolysis reaction. Under continued stirring, ethanol with 22 g of titanium i-propoxide dissolved therein was added dropwise to the resultant solution. Stirring was continued for a further 1 hour for sufficient reaction.

Then, a solution mixture consisting of 118 ml of an aqueous solution containing 1.5 mol/l of barium acetate and 48 ml of acetic acid was added to the sol. The solution was stirred for a further 3 minutes, and then poured into a fluorocarbon resin vessel of 10 mm in diameter to a depth of 30 mm. The vessel was closed off by putting the lid thereon for gelation at room temperature. Subsequently, the resultant gel was aged for 5 days, after which the gel was removed out of the vessel. The gel was placed in a separable flask, in which a solution having 0.7 mol/l of barium acetate dissolved in a 60° C. mixed solution of isopropanol and water at 6:4 was poured, and was dipped therein for 3 days to uniformly impregnate gel pores with barium acetate. Thereafter, the gel was dipped in varying solvents, say, methanol:ethanol at 5:5, and then ethanol, thereby precipitating and fixing microcrystalline barium acetate in the gel pores.

The obtained homogeneous gel was dipped for 40 hours in 150 ml of a solution having 0.3 mol/l of potassium acetate dissolved in a mixed solvent of methanol:acetone=2:1 to impart a concentration profile thereto, and then dipped in acetone to impart concentration profiles to microcrystalline barium acetate and potassium acetate, thereby precipitating and fixing them in the gel pores.

This gel was dried in 30° C. dry air for 5 days into a dry gel, which was finally heated to and sintered at 730° C. in a tubular furnace through which oxygen and helium were passed, thereby obtaining a crackless glass having a diameter of 4 mm. The concentration of barium at the center of this glass was approximately Ba/Si=0.42. The Ti/Si ratio was the same as that during sol preparation, say, 0.236.

By use of the glass composition according to the present invention, it is possible to provide an inexpensive gradient-index optical element material on industrially large scales and in stable manners, said gradient-index optical element material having a low and negative dispersion profile, and being able to be optically designed to have high optical effects.

What we claim is:

1. A gradient-index optical element consisting essentially of $SiO_2$, BaO, and $TiO_2$, and having a refractive index profile in a radial direction thereof, wherein a molar ratio of barium to silicon at a center thereof in said radial direction is Ba/Si≧0.4.

2. A gradient-index optical element consisting essentially of $SiO_2$, BaO, and $TiO_2$, and having a refractive index profile in a radial direction thereof, wherein a molar ratio of barium to silicon at a center thereof in said radial direction is Ba/Si≧0.4, and a molar concentration of titanium to silicon in said radial direction is Ti/Si≧0.2.

3. A gradient-index optical element consisting essentially of $SiO_2$, BaO, and $TiO_2$, and having a refractive index profile in a radial direction thereof, wherein a molar ratio of barium to silicon at a center thereof in said radial direction is Ba/Si≧0.4, a molar concentration of titanium to silicon in said radial direction is Ti/Si≧0.2, and $\Delta Ti/\Delta Ba \leq 0.15$ where $\Delta Ba$ is a difference in barium element ratio between a periphery of said optical element and a center of said optical element, and $\Delta Ti$ is a difference in titanium element ratio between said periphery and said center.

4. The gradient-index optical element according to claim 1, 2, or 3, wherein an element ratio of silicon, barium, and titanium is (Ba+Ti)/Si<1.2.

5. The gradient-index optical element according to claim 1, 2, or 3, which exhibits one of a low dispersion profile and a negative dispersion profile.

6. The gradient-index optical element according to claim 4, which exhibits one of a low dispersion profile and a negative dispersion profile.

7. The gradient-index optical element according to claim 1, 2, or 3, wherein a difference in refractive index between an optical axis of said optical element and a periphery of said optical element is $\Delta n \geq 0.02$.

8. The gradient-index optical element according to claim 4, wherein a difference in refractive index between an optical axis of said optical element and a periphery of said optical element is $\Delta n \geq 0.02$.

9. The gradient-index optical element according to claim 5, wherein a difference in refractive index between an optical axis of said optical element and a periphery of said optical element is $\Delta n \geq 0.02$.

10. The gradient-index optical element according to claim 6, wherein a difference in refractive index between an optical axis of said optical element and a periphery of said optical element is $\Delta n \geq 0.02$.

11. The gradient-index optical element according to claim 1, 2, or 3, in which a difference in refractive index between an optical axis of said optical element and a periphery of said optical element is $\Delta n \geq 0.01$, and which exhibits a negative dispersion profile property.

12. The gradient-index optical element according to claim 4, in which a difference in refractive index between an optical axis of said optical element and a periphery of said optical element is $\Delta n \geq 0.01$, and which exhibits a negative dispersion profile property.

13. The gradient-index optical element according to claim 5, in which a difference in refractive index between an optical axis of said optical element and a periphery of said optical element is $\Delta n \geq 0.01$, and which exhibits a negative dispersion profile property.

14. The gradient-index optical element according to claim 6, in which a difference in refractive index between an optical axis of said optical element and a periphery of said optical element is $\Delta n \geq 0.01$, and which exhibits a negative dispersion profile property.

* * * * *